United States Patent
Xu

(10) Patent No.: US 7,694,219 B2
(45) Date of Patent: Apr. 6, 2010

(54) DYNAMIC TREE REPRESENTATION FOR INTERNET ENTERPRISE APPLICATIONS

(75) Inventor: Songwen Xu, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 972 days.

(21) Appl. No.: 10/327,311

(22) Filed: Dec. 20, 2002

(65) Prior Publication Data
US 2004/0119743 A1    Jun. 24, 2004

(51) Int. Cl.
*G06F 17/00* (2006.01)
(52) U.S. Cl. ................ 715/234; 707/102
(58) Field of Classification Search ........... 715/513, 715/234, 760, 255, 200; 707/100, 10, 102
See application file for complete search history.

(56) References Cited

U.S. PATENT DOCUMENTS

| | | | | |
|---|---|---|---|---|
| 6,240,421 | B1 * | 5/2001 | Stolarz ................ | 707/102 |
| 6,253,254 | B1 * | 6/2001 | Erlenkoetter et al. ....... | 719/316 |
| 6,314,424 | B1 * | 11/2001 | Kaczmarski et al. ......... | 707/10 |
| 6,446,098 | B1 * | 9/2002 | Iyer et al. .................. | 715/513 |
| 6,466,240 | B1 * | 10/2002 | Maslov ...................... | 715/853 |
| 6,538,673 | B1 * | 3/2003 | Maslov ...................... | 715/853 |
| 6,775,675 | B1 * | 8/2004 | Nwabueze et al. .......... | 707/100 |
| 7,191,394 | B1 * | 3/2007 | Ardeleanu et al. .......... | 715/513 |
| 7,197,502 | B2 * | 3/2007 | Feinsmith .................. | 707/100 |
| 7,246,351 | B2 * | 7/2007 | Bloch et al. ................ | 717/175 |
| 2002/0078094 | A1 * | 6/2002 | Krishnaprasad et al. .... | 707/513 |
| 2003/0101235 | A1 * | 5/2003 | Zhang ...................... | 709/218 |
| 2003/0149934 | A1 * | 8/2003 | Worden ..................... | 715/513 |

OTHER PUBLICATIONS

Cormen, et al., "Introduction to Algorithms," The MIT Press, 1990, title page, copyright page, and pp. 250-253.*
Diztek, XML Database Engine-XMLDB & Persistent Document Object Model PDOM reference manual, 1999-2003, Diztek, pp. 1-34.*
Tree Table Idiom. http://java.sun.com/products/jlf/at/book/Idioms5. html. Printed on Jun. 3, 2003.
Tree Components. http://java.sun.com/products/jlf/ed2/book/HIG. Misc3.html. Printed on Jun. 3, 2003.
Design Guidelines: Lists, Tables, and Trees. http://java.sun.com/products/jlf/ed1/dg/higp.htm. Printed on Jun. 2, 2003.

* cited by examiner

*Primary Examiner*—Stephen S Hong
*Assistant Examiner*—Manglesh M Patel
(74) *Attorney, Agent, or Firm*—Townsend and Townsend and Crew LLP

(57) ABSTRACT

A tree is used for representing relationships between various entities and, in an embodiment, may be used for conducting transactions. In an embodiment, the tree may be dynamically updated at run time and/or each time an agent accesses the tree by, for example, conducting a transaction or requesting new information. An application running on a server may be used for accessing a database and generating a display language tree (which may be a tree written in a display language such as Hypertext Markup Language (HTML) or Extensible Markup Language (XML)). The application sends the display language tree to the agent's appliance where the display language tree is displayed. In an embodiment, nodes having different interrelationships, such as aggregation relationships and association relationships, may be handled differently from one another even if the same type of parent/child relationship is displayed in an image of the tree to the agent.

22 Claims, 9 Drawing Sheets

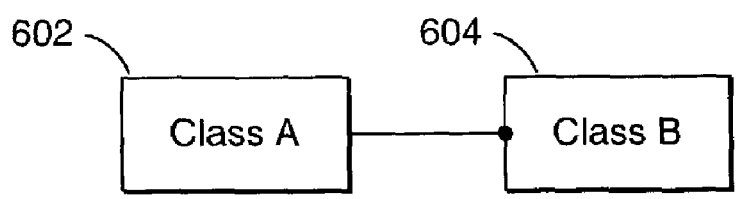
FIG. 6A
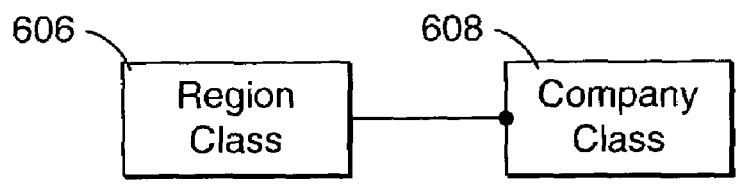
FIG. 6 B
| COMPANY | REGION |
|---|---|
| COMPANY 1 | REGION WEST |
| COMPANY 2 | REGION WEST |
| COMPANY 3 | REGION WEST |
| ⋮ | ⋮ |
FIG. 6C

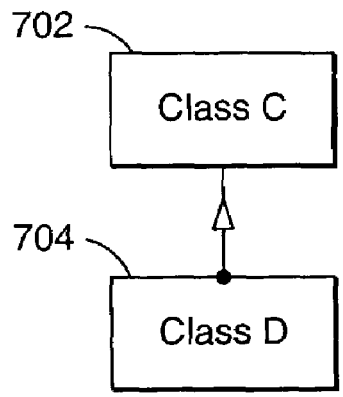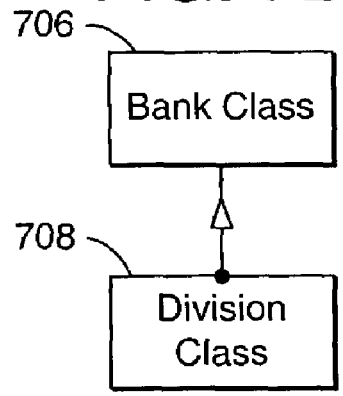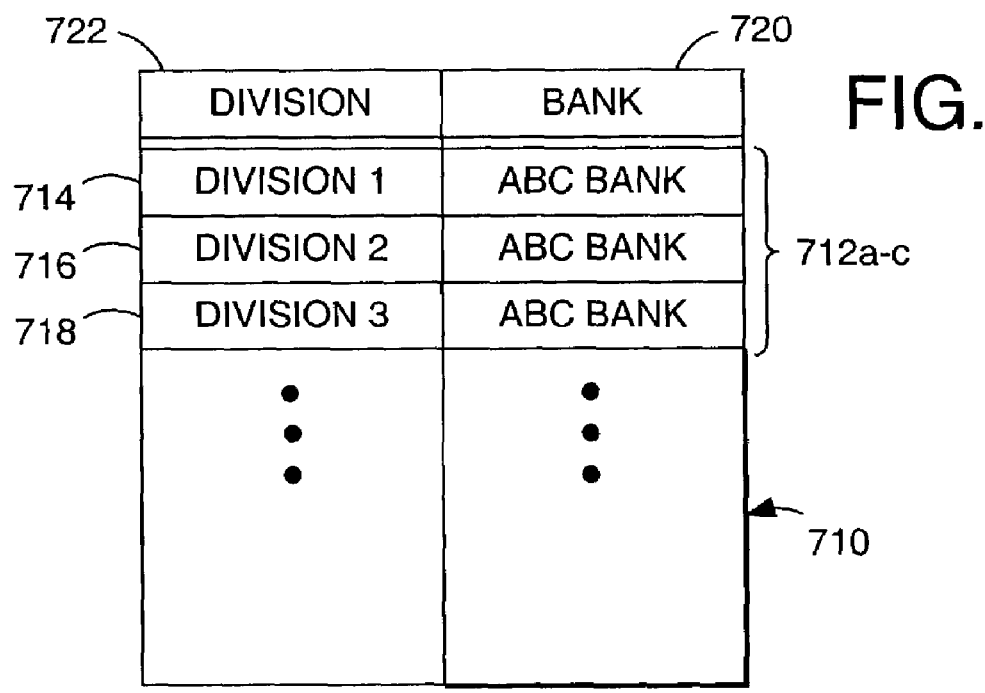

| Interaction Details | | | |
|---|---|---|---|
| Date: | 02/18/2002 | Time: 9:17 AM | 1100 |
| Contact Method: | Inbound Phone | ▽ | 1102 |
| Interaction Status: | Callback | ▽ | 1104 |
| | Callback Date: | | 1106 |
| | Callback Time: | | 1108 |
| Add Note: 1110 | | | Save 1116 |
| | | | Email 1112 |

Related Transactions (Interaction ID:116)

| Number | Description | Comments |
|---|---|---|
| 1 | Note | Callback with information requested. |

Finish and Return to Search
1114

FIG. 10

DYNAMIC TREE REPRESENTATION FOR INTERNET ENTERPRISE APPLICATIONS

BACKGROUND

1. Field of the Invention

This application relates to software for representing relationships between objects. More specifically, this application relates to software for building and maintaining trees that represent relationships between objects.

2. Discussion of Prior Art

There are several approaches for representing relationships between objects. One example of a system for representing relationships between objects is a tree. However, prior art trees are not convenient for use while conducting a transaction or to use in real time situations, because the information in them may not be current and updating the information they contain may be cumbersome. In this specification and in the prior art the terminology often used for trees includes terms such as "node," borrowed from math and science terms used to label a mesh; "branches," "roots," and "leaves," borrowed from the names of parts of a biological tree; and "parent," "child," and "sibling," borrowed from family trees.

Trees constructed in prior art tree managers are essentially "static," having nodes and leaves that are defined explicitly in the tree manager and saved in a database. For example, using a prior art system the organization of a bank may be provided on a page (a bank page) using a tree in which the branches are the divisions and departments of the bank. If a new division is added to the bank, called Div4 for example, the tree definition in the tree manager needs to be modified and saved, and then the user needs to go back to the bank page in order to view Div4 in the bank tree. The static trees constructed in prior art tree managers are not able to generate and/or update nodes and leaves dynamically at run-time.

In the prior art, the children nodes are handled in essentially the same manner no matter the nature of the relationship to their parent node. Similarly, nodes of different branches are handled in the same manner whether or not they are related.

Another example of a system for representing relationships between objects is a graphic tree generated by running Java™ classes on the client machine. Java™ graphic trees are not Hypertext Markup Language (HTML) trees. The performance of Java™ graphic trees is considered by some to be slow. The consumer must have the application Java classes installed on the client side. So, another problem with using graphic trees generated with Java™ is that the consumer must install the application on every client machine and then reinstall the application whenever there is an application upgrade.

SUMMARY OF THE INVENTION

A representation of relational and/or hierarchical information about a consumer or supplier is provided over a network. The representation may also be used for recording information about currently occurring transactions. The recorded information is used to dynamically update the representation of the consumer information and serve as a central application for conducting consumer interactions. For example, an agent may use the tree to enter, change, and/or retrieve data related to a transaction and/or a consumer while conducting the transaction and/or accepting the consumer as a customer. In an embodiment, the representation is a tree that is provided via a browser to a user. The tree may be provided in a display language, which in this specification is a language used to represent documents such as a markup language or a markup meta language. Examples of markup languages and markup meta languages are HTML, Standard Generalized Markup Language (SGML, a markup meta language), a language derived from SGML, Extensible Markup Language (XL, a markup meta language), and a language derived from XML. In an embodiment, the representation may represent relationships among a set of objects, stored in a relational database, in Internet web-based applications. (The term object is to be understood as being generic to its common meaning and its common meaning within the computer programming art.) The representation may use an interactive XML or HTML tree, for example, in order to present a picture that can easily be updated. The tree presented to the user or agent may be dynamically generated using a configurable definition of its nodes and leaves. Rather than relying only on a stored version of the tree that may be out of date the present system is able to generate the tree nodes and leaves (displayed on a browser, for example) at run-time based on the current data in the database tables.

An embodiment of the present system may represent association relationships and aggregation relationships in the same tree, but these two types relationships are handled differently. The handling of aggregation and association relationships differently can be performed in a static tree as well as in a dynamic tree.

An embodiment of the invention allows the user to paste the tree to and run the tree from within a window of another program from which the tree may be run (i.e., the user can "plug and play" the tree). To facilitate plug and play aspects, the tree representation may be implemented in an encapsulated module so that the tree representation can be plugged into other applications.

BRIEF DESCRIPTION OF THE INENTION

FIG. 6A shows the relationship of two associative classes;

FIG. 6B shows an example of the associative relationship of FIG. 6A;

FIG. 6C shows an arrangement of the keys associated with the companies and regions of FIG. 6B;

FIG. 7A shows the relationship of two aggregative classes;

FIG. 7B shows an example of the aggregative relationship of FIG. 7A;

FIG. 7C shows an arrangement of the keys associated with the bank and divisions of FIG. 7B;

FIG. 10 shows a dialog box for entering interaction details.

DETAILED DESCRIPTION OF EMBODIMENTS OF THE INVENTION

A system is provided for interacting with consumers using a tree that is in part refreshed with each new request for information. The tree can run in a plug and play manner from within other applications. In order to discuss the system, it is useful to be familiar with its various components and how they interact. Accordingly, the components of the system and how they interact are first described in FIGS. 1-5. After which further discussion of various aspects of the system follow.

Figure 1:
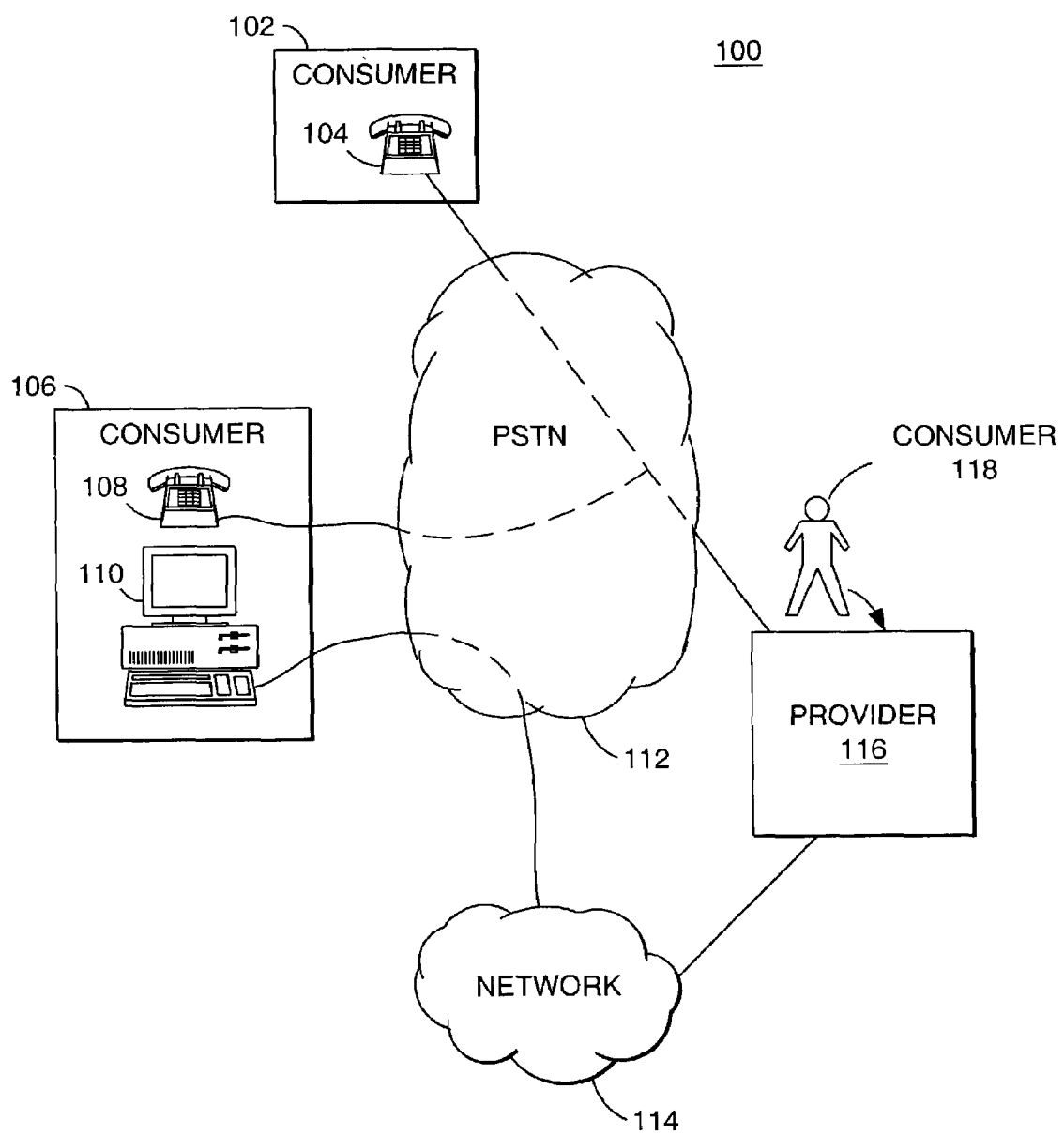
FIG. 1 shows a system for providing services and/or goods to a consumer, according to the present invention.

FIG. 1 shows a system 100 for providing services and/or goods to a consumer, according to the present invention. System 100 includes consumer 102, phone 104, consumer 106, phone 108, appliance 110, Public Switched Telephone Network (PSTN) 112, network 114, provider 116, and consumer 118.

FIG. 1 shows a system 100 in which consumers 102, 106, and 118 communicate with provider 116 in a variety of different ways. Consumer 102 uses telephone 104 and PSTN 112 to communicate with provider 116. Consumer 106 may use a combination of telephone 108 and appliance 110 to communicate via PSTN 112 and network 114 with provider 116. Appliance 110 could be a computer or any other Internet appliance, for example. Network 114 may be a Local Area Network (LAN) and/or a Wide Area Network (WAN) such as the Internet, for example. Provider 116 may provide a variety of goods and/or services. Consumer 118 communicates with provider 116 by visiting premises associated with provider 116. Consumers 102, 106, and 118 are just examples of the many different ways in which a consumer may communicate with provider 116 in system 100. Suppliers (or vendors) may also interact with provider 116 in the same manner as consumers. System 100 may have any number of consumers and/or suppliers communicating with provider 116.

Figure 2:
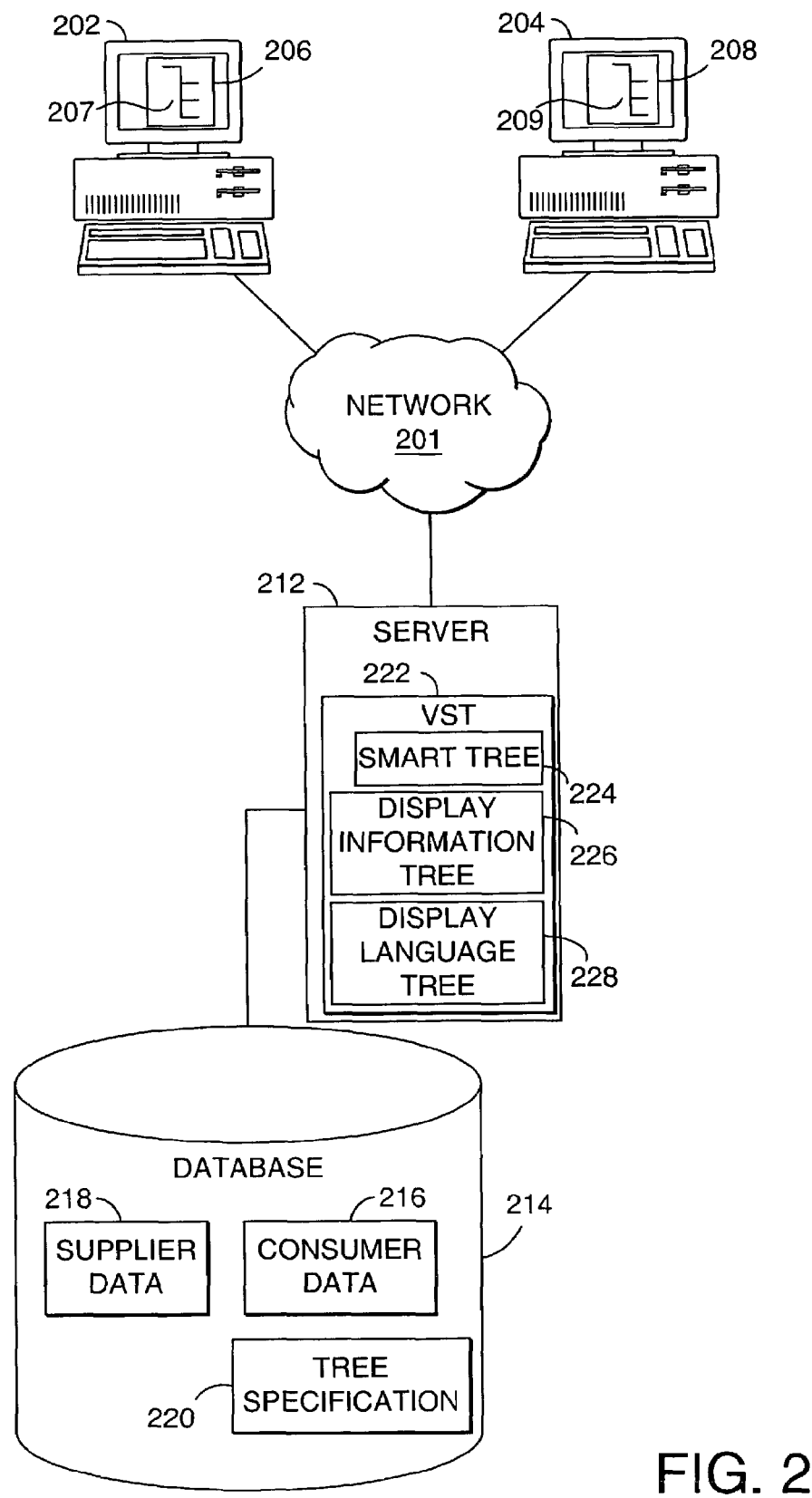
FIG. 2 shows a provider of the system of FIG. 1 and a network.

FIG. 2 shows provider 116 of system 100 of FIG. 1 and a network 201. Provider 116 includes, agents 202 and 204, browser 206, tree image 207, browser 208, tree image 209, server 212, database 214, consumer data 216, supplier data 218, tree specification 220, Virtual Specification Tree (VST) 222, smart tree 224, display information tree 226, and display language tree 228.

Network 201 may include any one of, any combination of, or all of network 114, PSTN 112, and/or a LAN and/or WAN other than network 114. Part of or all of network 201 may be included in provider 116. Alternatively, network 201 may be external to provider 116. Agents 202 and 204 may represent any user of the system of provider 116, such as a customer service representative. Agents 202 and 204 may include appliances with browsers 206 and 208, which are used while communicating, via network 201, with server 212. In this specification references to agents are generic to both the user and the appliance (e.g., computer or Internet appliance) associated with the agent. Tree images 207 and 209 differ from an image of the full tree (not shown) in that tree images 207 and 209 may be images of only a portion of the entire tree. Agents 202 and 204 may use tree images 207 and 209, respectively, to view information related to and/or relationships between consumers, suppliers, inventories, consumer accounts, and/or supplier accounts, for example. Tree images 207 and 209 facilitate a consumer interaction mode for Internet-based Customer Relations Management (CRM) applications or other applications running on the Internet, network 114, network 201, server 212, or on appliances associated with agents 202 and 204, for example. Users of the system of provider 116 (FIG. 1), such as agents 202 and 204, can use tree images 207 and 209 in browsers 206 and 208, respectively, for displaying transactions associated with consumers 102, 106, and 118 (FIG. 1), without any programming effort.

Server 212 utilizes database 214 to obtain data requested by agents 202 and 204 that are used for tree images 207 and 209. Although only two agents are shown, provider 116 may have any number of agents, which are represented by agents 202 and 204. Database 214 contains consumer data 216 and/or supplier data 218, and tree specification 220. Although server 212 and database 214 are depicted as two separate systems, they may be one and the same system. Server 212 and database 214 may be connected directly to one another or via a LAN and/or WAN.

Database 214 may include one or more processors and/or one or more memory devices. The processors and/or memory devices may be located in one location or distributed among several locations connected via a LAN and/or Wan. Database 214 may also be a collection of data files, which may be located in one location or distributed among several systems.

In an embodiment, the data for tree images 207 and 209 are stored in essentially one location in database 214. In order to allow storing data in one table, for example, data may be tagged (or keyed) with a segment identification characterizing the data (which may be referred to as SETID) and/or a group identification characterizing an organizational entity such as a business unit (which may be referred to as a Business Unit identification) that is associated with the data. The identifications of agents 202 and 204 may be determined according to a set control concept in which a determination may be made whether the agent is a member of a business unit. The segment identification or SETID may be used to identify relatively static sets of information such as definitional information, which may include accounting structure, descriptive information, and processing rules, for example. The group identification or Business Unit identification may be used to identify more dynamic information such as information about transactions, which may include information about cases and orders, for example. The Business Unit identification of a transaction may be determined by the group (e.g., the business unit or organizational entity) that agent 202 or 204 is a member of. Access to the data may be limited according to the segment identification allowing agents 202 and 204 to access only the information that they are allowed to view. Similarly, the group identification or Business Unit identification allows access only to part of the data according to the group or business unit that agent 202 or 204 is a member of In a database table one or more columns are provided in which each entry indicates one or more segment identifications, group identifications, and/or ranges or collections of segment identifications, and/or ranges or collections of group identifications that determine access to that row, thereby tagging or keying the rows. The identification of the agent 202 or 204 may be used in conjunction with segment identification and/or the Business Unit identification when determining whether to grant access to the data keyed by the group or Business Unit identification and/or the segment identification. Thus, using the set control concept a large amount of data can be accessed by a large number of users from only one table while allowing each user to access only those parts of the table to which he or she is entitled.

The configuration of the tree (not shown) associated with tree images 207 and 209 includes the contents and the appearance of tree images 207 and 209. When an agent 202 or 204 needs information about a consumer and/or supplier, agent 202 or 204 uses browser 206 or 208, respectively, to access server 212. In turn, server 212 runs a program that uses tree specification 220 to determine the configuration of the tree (not shown) associated with tree images 207 or 209. In an embodiment, tree specification 220 does not include an explicit tree representation. The tree representation is generated at run-time and not explicitly stored in database 214. Tree images 207 and 209 can be updated in part and/or refreshed at run-time to reflect the changes of the objects represented in the tree (adding, changing, or deleting objects). Tree specification 220 may include any of, any combination of, or all of a tree, a root node (the node at the highest level in the hierarchy), a record name, a node record name, and an ID field name, for example. The nodes/leaves related to the tree (not shown) associated with tree image 207 or 209 are decided and retrieved at run-time based on tree specification 220 and information associated with agents 202 and 204. Tree specification 220 is established when defining the tree (not shown) associated with tree images 207 and 209, respectively. It may be desirable to establish tree specification 220 prior to agents 202 and 204 accessing the tree (not shown) in relation to consumer interactions.

Regarding the content of the tree (not shown), tree specification 220 includes the type of information and where in consumer data 216 and/or supplier data 218 the information can be found. The actual values for the data are contained in consumer database 216 and/or supplier database 218. Using the example of a bank having divisions in different regions, logic and other information about the banks divisions, and regions may be stored in programming units called classes. If agent 202 or 204 would like to setup a tree showing the information related to the bank and its divisions and/or regions, agent 202 or 204 only needs to specify in the tree definition that he or she wants to display a tree having the relationships between the bank and its divisions and/or regions. The details of the bank, divisions, and regions are obtained from consumer data 216 and/or supplier data 218. Server 212 combines the details of consumer data 216 and/or supplier data 218 into tree images 207 or 209 in a page displayed on browser 206 or 208.

As another example, tree specification 220 may contain information dictating that the tree (not shown) should have a node for a consumer, under the consumer node there should be nodes for types of accounts, and under each node for each type of account there should be nodes for each account that displays their respective account numbers. In contrast, consumer data 216 may then contain information that one of the consumer nodes should be John Doe, under which there should only be one type of account, which should be a type appropriate for checking accounts (because, for example, John Doe does not own any types of accounts). Consumer data 216 may specify that there should be two nodes for two different checking accounts owned by John Doe. Consumer data 216 may further specify that John Doe's account numbers are 75143 and 16789.

Although VST 222 does not store an explicit representation of the tree (not shown) associated with tree images 207 and 209, VST 222 includes a virtual representation of that tree. Additionally, the tree (not shown) is a virtual tree that is not necessarily explicitly constructed. VST 222 may be a combination of coding and information stored in the computer memory that represents the tree (not shown) without explicitly constructing it. The configuration information of tree specification 220 is used to establish VST 222. The desired contents of the tree (not shown) may determine where in consumer data 216 and/or supplier data 218 a desired set of information can be obtained. VST 222 is used to determine where to obtain the desired information in consumer data 216 and/or supplier data 218. VST 222 is also used to send a display language tree such as an XML or HTML tree to browser 206 or 208 of agent 202 or 204 for creating tree images 207 or 209, respectively.

In an embodiment, VST 222 includes three virtual trees. One virtual tree, display language tree 228, is coding for generating a display of the tree on a screen. Display language tree 228 is stored on server 212. In an embodiment, display language tree 228 may be an XML tree or a HTML tree. In an embodiment, display language tree 228 is sent to agent 202 or 204 for creating tree images 207 or 209. In an alternative embodiment, a copy of all of or a portion of the coding that makes up display language tree 228 is sent to browser 206 or 208 and the copy is the display language tree used to create tree image 207 or 209 in browser 206 or 208, respectively. In an embodiment, each agent 202 and 204 engages in its own session, and each session has its own display language tree 228 stored on server 212. (A session is the period of time during which a user is logged on to the server. During the session the server 212 stores information particular to the user, which may be used to identify the user.) In an alternative embodiment there is only one display language tree 228 for all agents 202 and 204, and only the portion of display language tree 228 of interest is sent to a particular agent 202 or 204, with possible modifications to account for collapsed branches, is sent to that agent 202 or 204, respectively.

The second virtual tree, display information tree 226, may contain information defining how to arrange tree images 207 and 209 on browsers 206 or 208, respectively. Display information tree 226 typically contains a relatively large amount of information compared to the smart tree 224, which only contains necessary information needed for dynamically retrieving consumer data 216 and/or supplier data 218 and for updating tree images 207 and 209 (smart trees are discussed further, below). In an embodiment, display information tree 226 contains information about how to generate the coding that is display language tree 228. There may be one display information tree 226 for each display language tree 228. Display information tree 226 may be a table in which each row contains information related to how to display a corresponding line of an image of the tree (not shown). In an embodiment, each row of the table corresponds to a node of the tree (not shown). The names of the nodes used by display information tree 226 are the same as they appear in tree images 207 and 209. Display information tree 226 may include hierarchical information. Some of the rows of the table of display information tree 226 may correspond to parts of the tree (not shown) that are not included in tree images 207 and 209. Display information tree 226 may differ from the full tree (not shown) in that display information tree 226 is missing information about the full tree that has not been requested by agent 202 or 204. An example of information that has not been requested by agent 202 or 204 is nodes that are children of a collapsed node that has not been expanded. In an embodiment, in which there is one display language tree 228 for each agent 202 and 204, there may be a one to one correspondence between each of the display images 207 and 209 and the corresponding display language tree 228, because display language trees 228 may be identical to the display language trees resident on the appliances of agent 202 and 204. In an alternative embodiment in which there is only one display language tree 228, there may be a one to one correspondence between the parts of display information tree 226 and the display language tree 228. In an embodiment, display information tree 226 and/or display language tree 228 may be separate entities, part of a separate entity, or part of several separate entities that are different from VST 222.

The third virtual tree, smart tree 224, has names associated with nodes of the tree (not shown) and at least some organizational and/or other information about the tree (not shown) used to find the corresponding information in database 214 at run-time. In an embodiment, the names of the nodes used by smart tree 224 are the same as the names of the nodes used in database 214. These names may be different than the names used in tree images 207 and 209 for the same nodes. Smart tree 224 may contain information about which nodes are parents of, children of, and/or siblings of a given node, for example. Typically, smart tree 224 contains a relatively small amount of information when compared to display information tree 226. There may be one smart tree 224 for each display information tree 226. Smart tree 224 can be searched and can be used for obtaining information about the tree (not shown), tree nodes, or items related to the tree (not shown). Smart tree 224 is capable of performing logical operations for obtaining information about the tree (not shown). Smart tree 224 may also be capable of providing diagnostic information related to the tree (not shown). Smart tree 224 is not updated each time information is accessed. In contrast, display information tree 226 and display language tree 228 may be updated (or a portion of display information tree 226 and display language tree 228 may be updated) frequently with accesses of information associated with the tree (not shown). Elaborating on when the tree is and is not updated, in an embodiment, display information tree 226 is updated each time agent 202 or 204 expands a tree node for the first time in tree image 207 or 209 or conducts a transaction from tree image 207 or 209, respectively. However, in an embodiment, display information tree 226 is not updated if a node in a tree image is being collapsed or if a node that was previously expanded is being expanded again. In an embodiment in which there is only one display language tree 228, the display language tree 228 may optionally be updated only when display information tree 226 is updated. In contrast, in an embodiment in which there is one display language tree 228 for each agent 202 and 204 the display language tree 228 of a given agent 202 or 204 may be updated each time tree image 207 or 209, respectively, is updated.

Frequently, when agent 202 or 204 makes a new request for information, server 212 either reestablishes display information tree 226 or updates part of display information tree 226. Server 212 then sends the change in information to agent 202 or 204. In an embodiment, agents 202 and/or 204 may be capable of altering the information in database 214 in addition to or instead of being able to access information about the tree (not shown). Since VST 222 is in part reconstructed and/or updated frequently with requests for information (as explained above regarding when the tree is and is not updated), the changes to the database 214 (if relevant) will be incorporated into tree images 207 and 209 on browsers 206 and 208 of agents 202 and 204, respectively. The relation of VST 222 to server 212 is discussed further in conjunction with FIG. 4.

Figure 3:
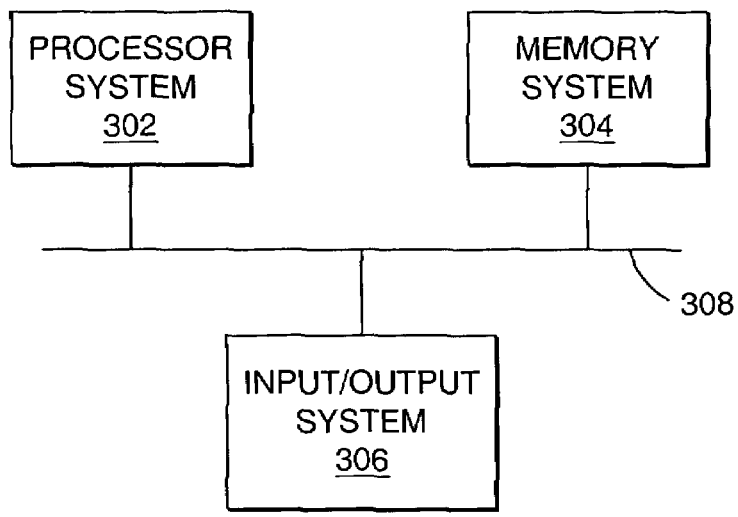
FIG. 3 shows the server of FIG. 2.

FIG. 3 shows server 212 of FIG. 2. Server 212 includes processor system 302, memory system 304, input/output system 306, and communications system 308.

Processor system 302 may run a variety of applications and may include only a single processor or any number of processors. The processors of processor system 302 may include general purpose processors, which may be configured to run in parallel with one another or in a distributed computing system. Processor system 302 may include one or more special purpose processors such as a memory management processor and a mathematical computations processor. Processor system 304 runs the applications that generate VST 222.

Memory system 304 may include one or any number of memory devices. Memory system 304 may include long term and/or short term memory, for example. Some examples of long term memory devices that may be included in memory system 304 are hard drives, optical disk drives, and tape drives. Some examples of short term memory that may be included in memory system 304 are Random Access Memory (RAM) and cache memory. Any one of, any combination of, or all of the processors of processor system 302 may be associated with a cache memory dedicated to it. Memory system 304 may include a database, such as database 214 and/or another database. Memory system 304 is discussed further in relation to FIG. 4.

Input/output system 306 may include any number of and/or any combination of modems, monitors, keyboards, mice, touch sensitive screens, and/or interfaces to outside systems and/or networks, for example. Input/output system 306 allows server 212 to communicate with database 214, agents 202 and 204 (FIG. 2), and/or a local computer operator, for example.

Communications system 308 may include a bus or one or more electrical and/or optical communications systems, for example. Communications system 308 is for sending messages and transferring data between processor system 302, memory system 304, and input/output system 306. If processor system 302 includes distributed processors, communications system 308 and/or processor system 302 may include a system for managing access to the components of communications system 308, for example.

Figure 4:
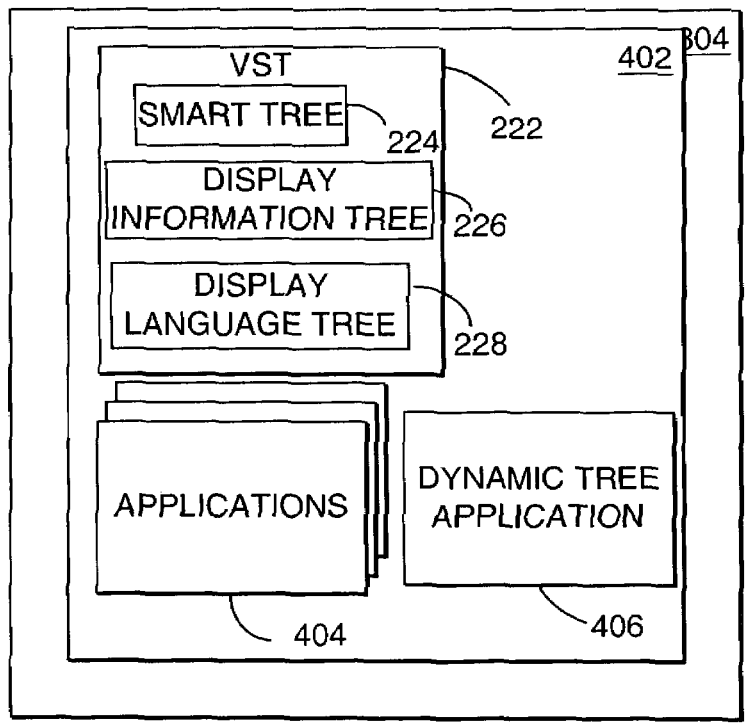
FIG. 4 shows the memory system of FIG. 3.

FIG. 4 shows memory system 304 of FIG. 3. Memory system 304 includes VST 222 (which may have smart tree 224 and display information tree 226), operating system 402, applications 404, and dynamic tree application 406.

Memory system 304 stores operating system 402 upon which applications 404 and dynamic tree application 406 run. Dynamic tree application 406 may be any one of, any combination of some of, or any combination of all of a computer program, firmware, and/or hardware. Dynamic tree application 406 generates VST 222. The coding for operating system 402, applications 404, and dynamic tree application 406 may be stored in long term memory of memory system 304. When operating system 402, applications 404, and dynamic tree application 406 are running they are at least in part resident in the short term memory of memory system 304. While dynamic tree application 406 is running, VST 222 may be stored in short term memory of memory system 304 (FIGS. 3 and 4) so that VST 222 does not need to be completely regenerated each time dynamic tree application 406 updates the tree (not shown) or when agents 202 or 204 (FIG. 2) request to view the tree (not shown). Dynamic tree application 406 can run or appear as a view or window within a window or view of any of applications 404. Similarly, dynamic tree application 406 can run or appear as a view or window within a window or view of any of application being run by agents 202 or 204 (FIG. 2). Additionally, dynamic tree application 406 can be used to establish an HTML tree or other display language tree within an application available on the Internet or any outside system.

Figure 5A:
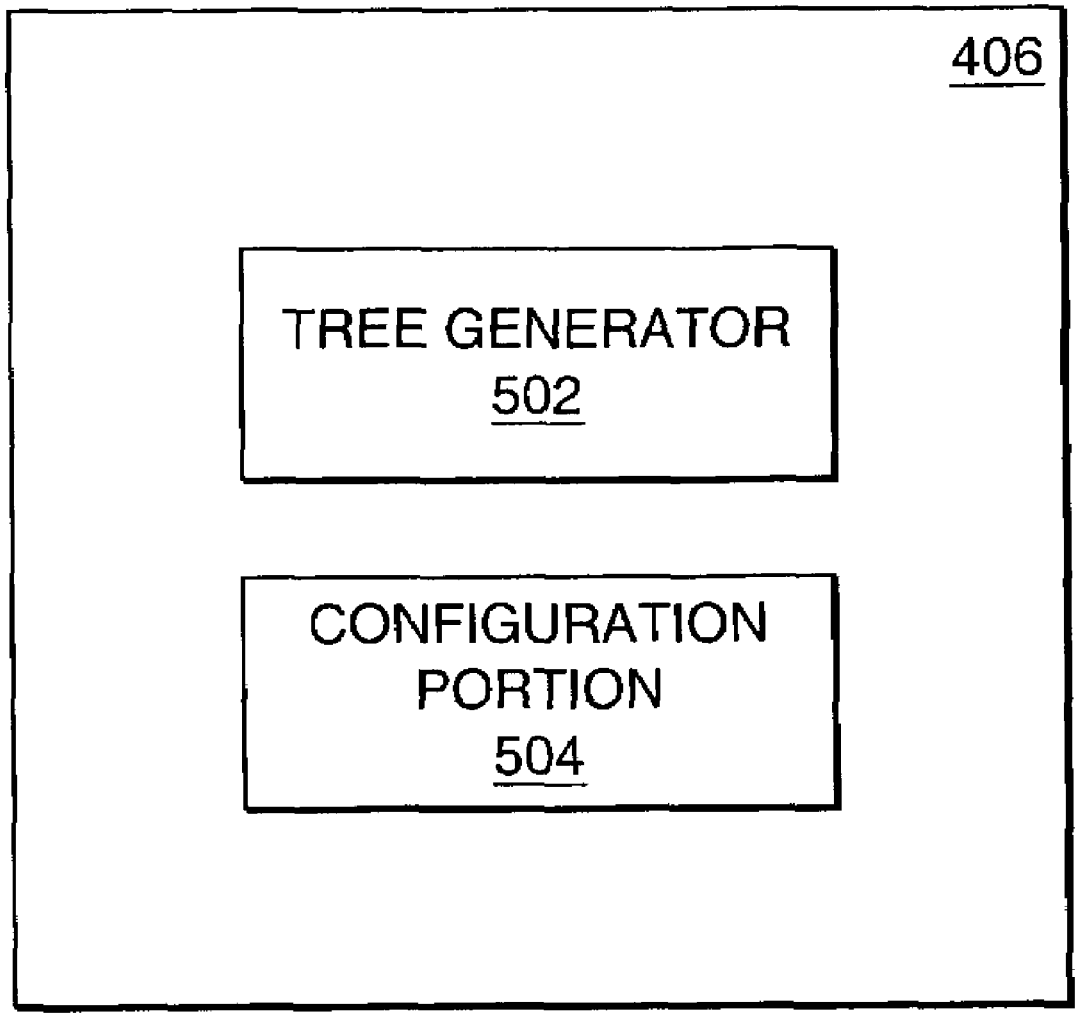
FIG. 5A shows the dynamic tree application of FIG. 4.

FIG. 5A shows dynamic tree application 406 of FIG. 4, having tree generator 502 and configuration portion 504.

Tree generator 502 generates VST 222 (FIG. 2) based on the configuration specified by configuration portion 504. Configuration portion 504 may include coding or hardware for generating the tree specification 220 and for adding information to consumer data 216 and supplier data 218 (FIG. 2). Configuration portion 504 may include one or more pages with dialog boxes for setting up and configuring tree specification 220 (FIG. 2). Configuration portion 504 may include one or more dialog boxes for cloning items such as a node, a tree, an interaction, or a set of interactions. When an item is cloned, a copy of the original item is created having a different name than the original item.

In contrast to configuration portion 504, tree generator 502 may include coding or hardware for gathering the information stored in tree specification 220, consumer data 216, and supplier data 218. Tree generator 502 may then assemble the gathered information into a tree. The nodes and the leaves of the tree (not shown) are defined in a configuration, by configuration portion 504. The configuration is stored as tree specification 220. Although tree generator 502 and configuration portion 504 are depicted as separate objects, they may be two functions of the same object having their respective lines of code and/or hardware parts interspersed with one another and/or may have different parts or subfunctions distributed among many objects or components of provider 116 (FIG. 1).

Regarding tree generator 502, to enhance the object orientation of the dynamic tree application 406 (FIG. 4), tree specification 220 (FIG. 2) may include only information related to the object identification and the object type of the desired tree. In an embodiment, all information related to the object type may be fetched from an object type class. Upon running tree generator 502 of dynamic tree application 406, the tree type information is fed into a tree object (smart tree 224) to generate a tree (display information tree 226). In an alternative embodiment tree generator 502 may include display information tree 226 (FIG. 2). Similarly, configuration portion 504 may include smart tree 224 (FIG. 2).

Figure 5B:
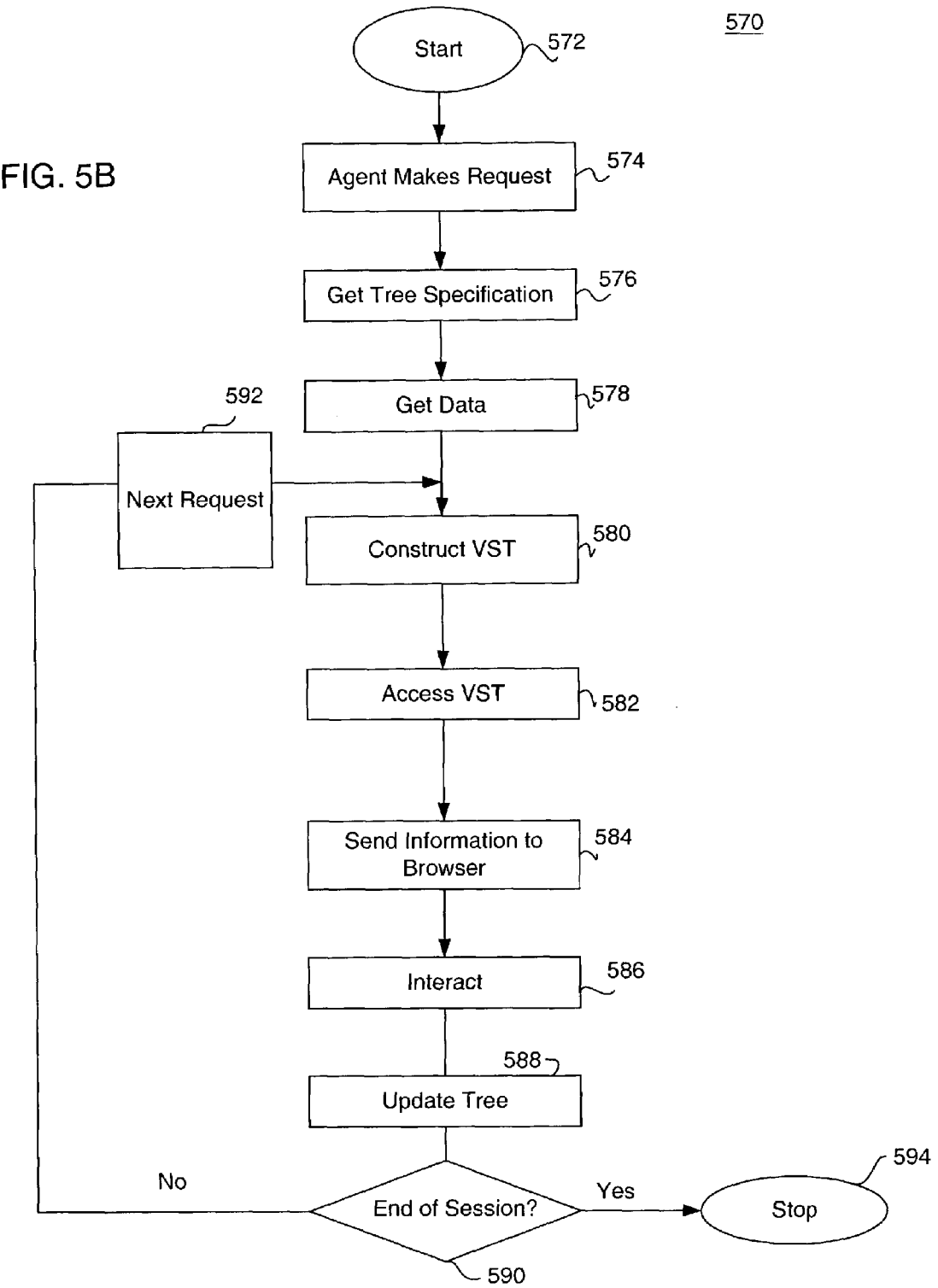
FIG. 5B shows a method of operation of the dynamic tree application.

FIG. 5B shows a method 570 of operation of dynamic tree application 406 (FIG. 4). Method 570 begins with step 572 in which agent 202 or 204 (FIG. 2) starts using dynamic tree application 406. Step 572 may include agent 202 or 204 turning on a computer, logging on to a computer, logging onto server 212 (FIG. 2), opening browser 206 or 208 (FIG. 2) and/or starting or calling dynamic tree application 406. Next, in step 574, agent 202 or 204 enters a request into browser 206 or 208. A signal is sent from the appliance of agent 202 or 204 to server 212. Step 574 may occur after a consumer contacts agent 202 or 204 and requests information or a transaction. Alternatively, agent 202 or 204 may have other reasons for requesting information or conducting a transaction. Next, in step 576, the signal from agent 202 or 204 is processed by server 212. In response, server 212 accesses database 214 (FIG. 2) and retrieves tree specification 220. In step 578, server 212 retrieves consumer data 216 and/or supplier data 218 (FIG. 2). In step 580, server 212 uses tree specification 220 and consumer data 216 and/or supplier data 218 to construct VST 222 (FIG. 2). At step 582, VST 222 is accessed for the information requested by agent 202 or 204. At step 584, the requested information is sent to browser 206 or 208 of agent 202 or 204, respectively. At step 586, the interaction is conducted, which may be nothing more than providing information to the consumer or may involve a sale, opening an account, closing an account, and/or a change in ownership of goods and/or money, for example. The interaction may result in changes in the information associated with the tree (not shown). Next, in step 588, if appropriate, the relevant components associated with the tree (not shown) are updated, which may involve updating display information tree 226 (FIG. 2) and display language tree 228 (FIG. 2), consumer data 216, and/or supplier data 218.

Next, in step 590, a decision is made whether to end the session. Application 406 may be set to end the session after a set interval of time in which there is no communications from agent 202 or 204. The time period may vary according to the interaction being conducted and the particular agent 202 or 204. The session may be set to end after an explicit request by agent 202 or 204 to end the session. Application 406 may end the session automatically after certain types of transactions. Step 590 may involve waiting for agent 202 or 204 to make an entry into fields of browser 206 or 208, respectively. The entry may be a new request of step 592 or may be agent 202 or 204 logging out or otherwise terminating the session, for example. If in step 590 it is determined that the session should be ended, the method proceeds to step 594 to end the session.

If the session is not ended, method 570 proceeds to step 592 in which the agent 202 or 204 makes the next request by entering the request into browser 206 or 208, respectively, which causes another signal to be sent to server 212. In response, display information tree 226 (or VST 222, FIG. 2) is at least in part reconstructed or updated in step 580 using the updated data. Reconstructing display information tree 226 of VST 222 may involve reconstructing only those parts that are affected by the updating or may involve reconstructing the entire tree. Optionally, steps 576 and 578 will also be repeated while reconstructing display information tree 226.

FIG. 6A shows two classes having an association relationship, class A 602 and class B 604.

In the example of FIG. 6A, the existence of class A 602 and class B 604 does not depend on one another. In general, the existence of two associated classes does not depend upon one another. An instance of class A 602 may be referred under a certain role in an instance of class B 604 in a form of an attribute of the instance of class B 604. In other examples, two classes may be associated with one another without one being an attribute of an instance of the other. However, having one referred by a role name as an attribute of an instance of its child may be desirable for association relationships.

In FIG. 6A a line with no arrow is used to represent an association relationship. The filled circle connecting the line to the box of class B 604 signifies that there can be any number of class B 604 is associated with class A 602. In this example, there is only one instance of class A 602 for an instance of class B 604. The line does not have a filled circle at its junction with class A 602, because there is only one class A 602. In other examples, each class may have several other classes with which it has association relationships. When displayed in tree image 207 or 209, the node representing class A 602 may appear as a parent of the node representing class B 604 despite their aggregation relationship. Alternatively, class A 602 and class B 604 may appear anywhere in tree image 207 or 209 with respect to one another.

FIG. 6B shows an example of the association relationship of FIG. 6A, having region class 606 and company class 608.

In FIG. 6B, region class 606 is an example of class A 602 (FIG. 6A) and company class 608 is an example of class B 604 (FIG. 6A). The values of region class 606 specify the region in which the companies of company class 608 are located. Changing the designation of the regions does not effect whether or not a company is in existence. A company only belongs to one region while a region can have many companies. In another example, two associated classes may be accounts for a husband and wife.

FIG. 6C shows an arrangement of the keys associated with the companies and regions of FIG. 6B. FIG. 6C includes company table 610, table entries 612a-c, 614, 616 and 618, region column 620, and company column 622.

Referring to FIG. 6C and table 610, an instance of region class 606 (FIG. 6B) may be "Region_West," for example, which has been entered in table entries 612a-c of company column 622. Region_West may be an attribute of Company1 in table entry 614, Company2 in table entry 616, and Company3 in table entry 618. Company1, Company2, and Company3 are listed in company column 622 and represent instances of company class 606 (FIG. 6B).

A key is a column in a database table whose value is to be used as an identifier, such as a number, to identify a row of a database table. A primary key is a key with a unique value in each row. A primary key can be used as a unique identification of a row. A combination key is a combination of several keys.

None of the keys in a combination key needs to be unique, as long as the entire combination key uniquely identifies a row. If there is not any primary key, a combination key may function as a primary key. A foreign key is also a column in a database table whose value is used as an identifier of a row, but many rows may have the same value for a foreign key. The foreign keys of a table usually have the same name as a key of another table. The region identification is a foreign key in table 610, but not part of any combination key. The company identification is a primary key. A characteristic of association relationship is that deleting Region_West from Region table (not shown) does not require the deletion of rows for Company 1, Company 2, or Company 3 from company table 610 (even if in tree image 207 or 209, Company 1, Company 2, and Company 3 were displayed as children of Region_West), because these companies can be reclassified into a new category called "Region_US." The new region, Region_US, may include the deleted Region_West in addition to other deleted categories. Region_US would be placed in table entries 612*a-c*. In this case, Company1, Company2, and Company3 are associated to a different instance of Region class 608 (FIG. 6B).

FIG. 7A shows two classes that have an aggregation relationship, class C 702 and class D 704.

In aggregation relationships, the existence of one class depends on the existence of another class. Consequently, in contrast to FIG. 6A, the existence of class D 704 depends on the existence of class C 702. In FIG. 7A (similar to FIG. 6A), it may be desirable to make an instance of class C 702 an attribute of an instance of class D 704. In FIG. 7A an arrow is used in representing the aggregation relationship. Similar to FIG. 6A, the filled circle indicates that there may be many instances of class D 704. As designated by the lack of a filled circle at the junction between the line and class C 702, there can be only one instance of class C 702 for class D 704. Class C 702 and class D 704 may be displayed anywhere in a tree with respect to one another. For example, class C 702 and class D 704 may be displayed in nodes that are siblings with respect to one another despite their aggregation relationship.

FIG. 7B shows an example of the aggregation relationship of FIG. 7A, having bank class 706 and division class 708.

In FIG. 7B (similar to FIG. 6B), bank class 706 is an example of class C 702 (FIG. 7A), and division class 708 is an example of class D 704 (FIG. 7A). The values of bank class 706 specify the bank in which the divisions of division class 708 are located. In contrast to FIG. 6B, if a bank of bank class 706 is deleted, all of the divisions for which it is an attribute must also be deleted, because they no longer exist.

FIG. 7C shows an arrangement of the keys associated with the banks and divisions of FIG. 7B. FIG. 7C includes division table 710, table entries 712*a-c*, 714, 716, and 718, division column 720, and bank column 722.

Referring to FIG. 7C and division table 710 (similar to FIG. 6B), an instance of bank class 706 (FIG. 7B) may be ABC Bank, for example, which has been entered in table entries 712*a-c* of bank column 720. ABC Bank may be an attribute of Division1 in table entry 714, Division2 in table entry 716, and Division3 in table entry 718. Division1, Division2, and Division3 represent instances of division class 706 (FIG. 7B) that are listed in division column 720. A characteristic of aggregation relationship is that deleting ABC BANK from another table that lists all banks (in such a table the banks are primary keys), for example, requires the deletion of the rows for Division 1, Division 2, and Division 3 from division table 710.

Figure 8:
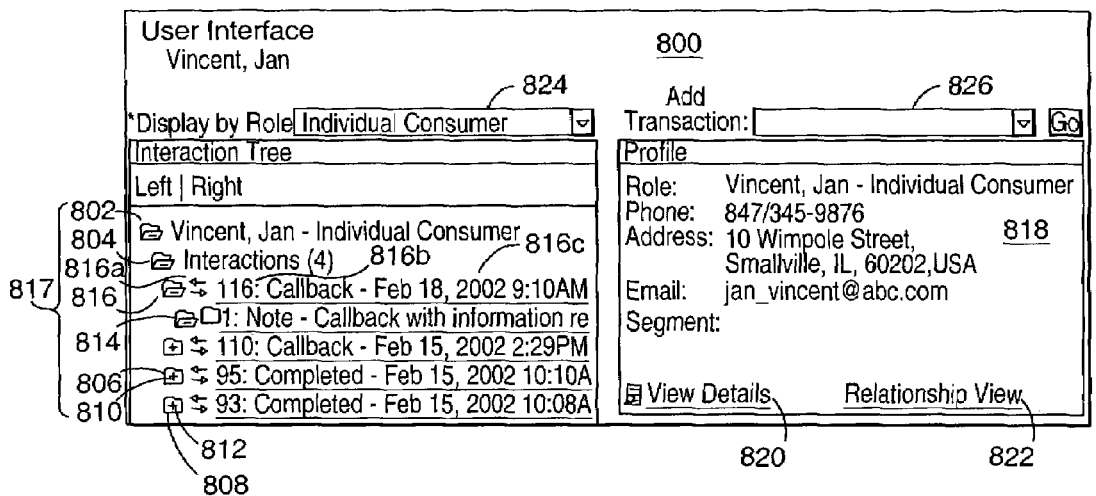
FIG. 8 shows a user interface according to the invention.

FIG. 8 shows a user interface 800. User interface 800 includes node 802, folder icon 804, nodes 806 and 808, folder icon 810, plus sign 812, nodes 814 and 816, node icon 816*a*, node name 816*b*, node description 816*c*, tree image 817, profile subpage 818, view details link 820, relationship view link 822, display by role field 824, add transaction field 826, and go button 828.

User interface 800 is an example of a user interface or tool for managing consumer interactions (and may be referred to as an interaction manager). In the example shown in FIG. 8, tree image 817 is presented along side the related profile of an individual (Vincent, Jan). User interface 800 may be both the entry point for all consumer interactions and the central point to launch all consumer transactions, including quote creation, order creation, case creation, and opportunity creation, for example. An interaction is the sum of the events that take place when a consumer has contact with the organization. Interactions may be comprised of sub-interactions, which are the events themselves. User interface 800 can be configured to a specific consumer's needs using configure portion 504 (FIG. 5) of application 406 (FIG. 4). User interface 800 enables a customer service representative to access consumer profile information, manage transactions, record interactions, and view all consumer interactions using tree image 817.

In FIG. 8, node 802 is a parent to nodes 806, 808, and 816. Nodes 802, 806, 808, and 816 are part of tree image 817. Tree image 817 is an example of tree images 207 and 209 (FIG. 2). Nodes 806 and 808 are siblings to one another and children to node 802. Node 814 is a child to node 816. Node 816 is a parent to node 814 in addition to being a child to node 802 and a sibling of nodes 806 and 808.

Each tree node of tree image 817 reports to another tree node at a higher level of organization, until the top level of the hierarchy, the root node, is reached. Node 802 could be an example of a root node, which in this embodiment of the invention appears at the top left of tree image 817. In an embodiment, user interface 800 may represent a branch of the tree in which node 802 is the highest level node displayed. In an embodiment, trees of user interface 800 are built from the highest level of the hierarchy (root node 802) to the lowest level of the hierarchy (node 814).

Node 816 has a node icon 816*a*, node name 816*b*, and node description 816*c*, according to the invention. The type and format of node icon 816*a*, node name 816*b*, and node description 816*c* may vary depending on what the node represents. For example, there may be different formats for different types of interactions. Node icon 816*a* is a graphical icon giving a pictorial representation for reminding agent 202 or 204 (FIG. 2) what type of information is contained within node 816. Node name 816*b* is a short title suggestive of the content under node 816*b*, while node description 816*c* is a longer description of the information under node 816. Any given node may not have a node icon, node name, and/or node description. In an embodiment, some or all of the nodes have two columns. Any of node icon 816*a*, node name 816*b*, and node description 816*c* can be placed into either of the two columns.

Node 802 is expanded, so its folder icon 804 is displayed as open. Nodes 806 and 808 are interaction nodes for interactions 95 and 93, respectively. Nodes 806 and 808 are collapsed, so the folder icon 810 is closed. Plus sign 812 on folder 806 indicates that there is additional information that can be viewed in an expanded view. Node 814 does not have any children reporting to it, and therefore may be represented by a gray folder, for example.

All interactions and sub-interactions are included in the tree (not shown) represented by tree image 817 of user interface 800, and may be displayed in tree image 817. The profile subpage 818 displays an entity's role, phone number, address, e-mail, and marketing segment (indicated by "Segment:"). Agents 202 and 204 (FIG. 2) can view and update the entity's profile information by clicking the view details link 820. Agents 202 and 204 can view all the relationships for the entity using the relationship view link 822. The entity (e.g., Vincent, Jan) may be a person (as in the example shown in FIG. 8) or organization, for example.

Display by role field 824 enables agents 202 and 204 (FIG. 2) to select the role in which a contact person is conducting the transaction. The contact person may be acting as an individual consumer, an individual supplier, as a representative of a company, or as the representative of another consumer or another individual (such as an account holder), for example. The default role may be All, which may include all possible roles. Display by role field 824 generates profile information for the role. Display by role field 824 filters the view of the tree image 817. Only those interactions related to the role of display by role field 824 will be shown in image display 817 as a result of the filtering associated with display by role field 824. Otherwise, using the default All, tree image 817 displays a record of all interactions with the person being displayed (e.g., Vincent, Jan). Agent 202 or 204 selects the transaction to perform, via add transaction field 826, from a drop down menu associated with the dialog field of add transaction field 826.

An interaction can be created, viewed or changed by agent 202 or 204 (FIG. 2) clicking on user interface 800. Agent 202 or 204 may also add a new transaction by clicking go button 828. User interface 800 may be brought up automatically through Computer Telephony Integration (CTI), and an interaction may be automatically created for a phone conversation.

Using user interface 800, dynamic tree application 406 (FIG. 4) is capable of representing relationships among objects including association relationships and aggregation relationships. Nodes having different relationships will be handled differently. Similarly, two pairs of nodes having parent/child relationships displayed in tree image 817 will be handled differently depending on whether the parent and child have an aggregation relationship or an association relationship. If a parent node having an aggregation relationship with its children is deleted, the children are also deleted. In an embodiment, dynamic tree application 406 may present a dialogue box to the user to check if the children nodes are also supposed to be deleted before deleting them. If a parent node having an association relationship with its children is deleted, the children are typically not deleted. In an embodiment, the children automatically are moved to the hierarchical level of the deleted parent. In an alternative embodiment, a hidden node is used to replace the associated parent node. In another embodiment, dynamic tree application 406 presents dialog boxes to agent 202 or 204 requesting how to reconfigure the associated children nodes that lost their parent (the deleted parent node). Although the discussion of this paragraph refers to children, the references to "children" apply to all descendents.

Similarly, nodes in which neither is a descendent of the other will be handled differently depending on whether they are related to one another. If there is no relationship between nodes, then the deletion of one node of one branch does not affect the other unrelated nodes of other branches. If these nodes are related, they may also be handled differently depending upon if their relationship is an aggregation or an association. If two nodes have an association relationship and one is deleted, although the other is not deleted it may need to be updated to reflect the deletion. In an embodiment, dynamic tree application 406 may present a dialogue box to the user to check if the other related nodes are also supposed to be updated before updating them, because the relationship may be in error, for example. In contrast, if one node is deleted having an aggregation relationship with other nodes, the other nodes are deleted. In an embodiment, a dialogue box is presented to the user to check if the other nodes should be deleted before deleting them.

Although in the example of FIG. 8 the tree is dynamic, nodes of static trees with association or aggregation relationships could also be treated in the manner described in the above two paragraphs.

The tree image 817 may be used as the entrance of CRM applications, such as one of applications 404 (FIG. 4). In other words, clicking on a node or leaf of user interface 800 may open a CRM application or other application 404. After entering an application 404, an agent 202 or 204 (FIG. 2) can perform various transactions from the entrance and then return to the tree displayed on browsers 206 and 208.

The tree associated with tree image 817 is highly configurable. The icons representing the nodes and the text of the nodes and the structure of the tree, such as the number of nodes under the root, can be configured. The leaves under a child node of user interface 800 may be specified in a database view, for example.

Actions can be defined that are performed on nodes in response to a user clicking on a node. For example, clicking on root node 802 may refresh the tree, clicking on a node may create an object, and clicking on a leaf may cause a view to appear showing the details of the object represented by the leaf. In an embodiment, the number of leaves a node has can be shown on the node before the node is expanded. Dynamic tree application 406 (FIG. 4) may support multiple fonts and languages. The tree (not shown) is scaleable to any number of levels.

The nodes of tree image 817 may be associated with instances and classes of dynamic tree application 406 or other applications. Adding a node to tree image 817 may add one or more instances of various objects to dynamic tree application 406 or another application.

The manner in which sub-interactions are created can also be configured to meet a consumer's needs. Using a configure interaction manager component, whether or not a transaction is to be captured as a sub-interaction can be specified. An interaction (e.g., interaction nodes 804 and 806) may contain multiple sub-interactions. For example, a call with a consumer may involve a case being updated, a service order being added, and a note about the consumer being sent. All of these sub-interactions may be logged under the same interaction and node (or may be represented by children to nodes 804 and 806).

In an embodiment, user interface 800 may include a consumer view, a representative view, and a company view—each view being configured to meet the needs of a different type of viewer. In an embodiment, interactions are created automatically from the consumer and representative view, but not from the company view, because the managers accessing the company view are typically interested in viewing the history of transactions rather than actually conducting transactions. However, in another embodiment, interactions may be automatically created in the company view also and/or not automatically created in the representative and/or consumer view.

In an embodiment, dynamic tree application 406 takes advantage of having gathered all the information associated with a consumer or supplier to provide diagnostic and related information. Using the example of a brokerage firm, dynamic tree application may indicate that the consumer is overly invested in high risk funds, for example.

Figure 9:
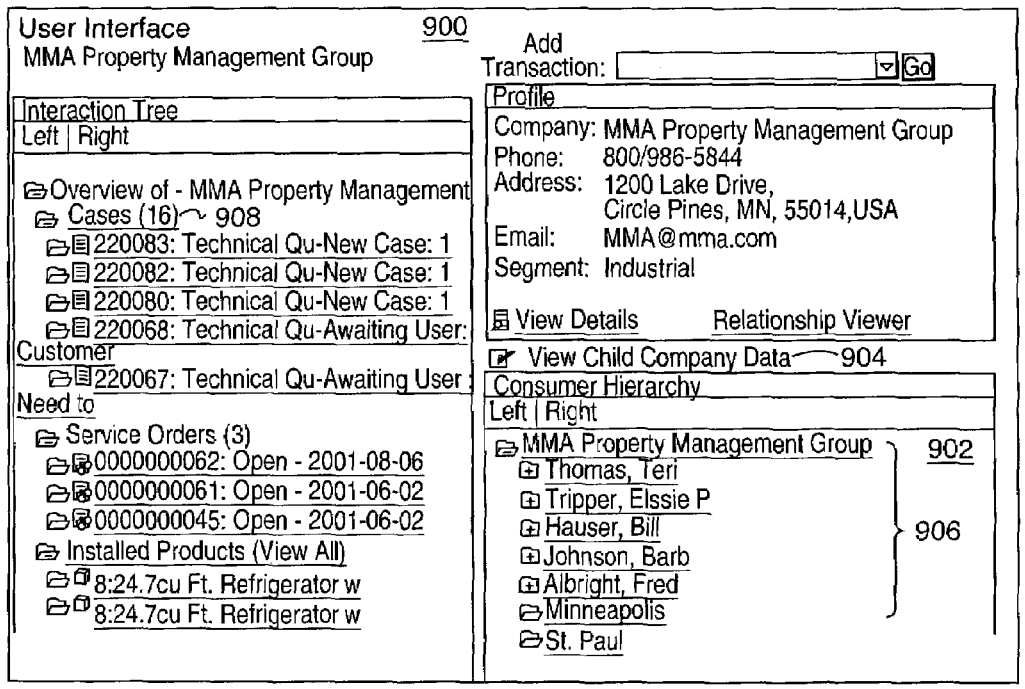
FIG. 9 shows an example of another configuration of the user interface according to the invention.

FIG. 9 shows an example of user interface 900 having another configuration that is different than user interface 800. User interface 900 includes child company viewer 902, check field 904, consumer hierarchy tree 906, and number of nodes 908.

User interface 900 is an example of how user interface 800 can be configured for consumer needs. In the example of FIG. 9, the tree for an organization (MMS Property Management Group) is presented. Also, in the example of FIG. 9, the child company viewer 902 can be selected to show consumer hierarchy tree 906. One of the differences between user interface 800 and user interface 900 is user interface 900's ability to view consumer hierarchy tree 906. Consumer hierarchy tree 906 may show any of agents, employees, or subsidiaries of the company, for example. A consumer flattener batch program (a program that extracts consumer hierarchical data from information associated with the tree) may be run to aid in displaying child company data. The consumer flattener batch program may be associated with smart tree 224 (FIG. 2). The check field 904 is shown only when it is desired to view child company data. There may be another page having a check box that is checked that allows the child company data to be viewed. The checkbox could also be replaced with several other types of fields such as a field in which a "Yes" can be entered. Whether the check box is checked, for example, may depend upon the type of user accessing the data. For example, if the user logs in as a salesperson, the check box may be checked. In contrast, if the user logs in as an administrative assistant, the child company data may not be checked. In an embodiment, the child company check field 904 is hidden for non-sales users. If the child company check field 904 is checked, the consumer hierarchy tree 906 displays child companies with hyperlinks, which once clicked will refresh the interaction tree for the focused child company. The consumer hierarchy tree 906 displays a hierarchical view of company relationships.

Number of nodes 908 is a number that indicates the number of child nodes associated with a parent node. The actual number of child nodes displayed may be smaller than number of nodes 908. How many and which of the child nodes are displayed is configurable using configuration portion 504 (FIG. 5). Agents 202 or 204 may be able to scroll through the child nodes without otherwise changing tree image 207 or 209, respectively.

FIG. 10 shows interaction details subpage 1100. Interaction details subpage 1100 includes contact method field 1102, select the status field 1104, call back date field 1106, call back time field 1108, add note field 1110, e-mail link 1112, return to search link 1114, and save icon 1116.

Using the dialog box of interaction details subpage 1100, a user such as a Customer Service Representative (CSR) associated with agent 202 or 204 (FIG. 2) can capture the details of the interaction. Interaction details subpage 1100 may be entered upon clicking on a node of the user interface 800 or 900. In an embodiment, after clicking on a node of interaction details subpage 1100 a search dialog box is presented to the user for finding the desired object, item, or consumer associated with the desired object or item. If the desired object or item is a new interaction, the result of the search is to present interaction details subpage 1100. Interaction details subpage 1100 can be configured according to the needs of provider 116 (FIG. 1) and the consumer associated with the interaction.

Using interaction details subpage 1100, the CSR can record the callback date and time, attach notes to the interaction, and send an e-mail to the consumer or internal personnel, provided e-mail link 1112 is set up. Specifically, contact method field 1102 is used for recording the method of contact for the interaction having values, such as "Inbound Chat," "Inbound E-mail," "Inbound Fax," "Inbound Phone," "Inbound Web," "Outbound E-mail," "Outbound Fax," and "Outbound Phone." Select the status field 1104 is used for recording the status of the interaction and may have values, such as "Busy," "Callback," "Child Answered," "Completed," "Do Not Call Again," "In Process," and "No Answer." Call back date field 1106 and call back time field 1108 are used for recording the time and date when to call back. Add note field 1110 may be used for keeping notes about a conversation. The user may then save the notes in note field 1110 by clicking the save icon 1116. E-mail link 1112 may be used to open a field for composing an e-mail message. To finish the interaction with the current consumer, the user may click on finish and return to search link 1114 to return to user interface 800 or 900 (FIG. 8 or 9). In an embodiment, clicking on return to search link 1114 may return the user to the search dialog box. The search dialog box is then closed to return to user interface 800 or 900. Dynamic tree application 406 (FIG. 4) may use a cookie to retain consumer information during the transaction. Dynamic tree application 406 (FIG. 4) may be set up to require that the user click on the finish and return to search link 1114 to begin working with a new customer. A role of the costumer must be selected using display by role field 824 (FIG. 8) on user interface 800 in order to add a new transaction and access interaction details subpage 1100. In an embodiment, interaction details subpage 1100 may open automatically upon clicking on or adding a node (to user interface 800 or 900) for a new interaction or subinteraction, for example.

In summary, provider 116 (FIG. 1) runs dynamic tree application 406 (FIG. 4) on server 212 (FIG. 2). Dynamic tree application 406 accesses tree specification 220 (FIG. 2) to determine the configuration of the tree (not shown). Dynamic tree application 406 accesses consumer data 216 or supplier data 218 (FIG. 2) to determine the content of the tree (not shown). Configure portion 504 (FIG. 5) of dynamic tree application 406 includes one or more dialog boxes for configuring a new tree or reconfiguring an old tree. Tree generator 502 (FIG. 5) uses the configuration and content of the tree (not shown) gathered from tree specification 220 and supplier data 218 and/or consumer data 216 to construct smart tree 224 and display information tree 226 (FIG. 2). Display information tree 226 keeps track of the contents of the tree (not shown). Smart tree 224 keeps track of the configuration of the tree (not shown) and performs logical operations such as searches related to the tree (not shown). Display information tree 226 is used for generating display language tree 228. Display language tree 228 (which may be an XML or HTML tree, for example) is sent to agents 202 and 204 for generating tree images 207 and 209 on browsers 206 and 208 (FIG. 2), respectively. Agents 202 or 204 (FIG. 2) interact with tree image 207 or 209 for conducting consumer interactions. Tree images 207 and 209 and display information tree 226 are updated with each request for information, while smart tree 224 is not. Tree images 207 and 209 can be configured in their overall appearance to best suite each of agents 202 and 204 and provider 116. Tree images 207 and 209 can also be configured in the manner in which they respond to interactions with consumers as well as with a user associated with agents 202 and 204.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A system for generating representations of information, the system comprising:
a set of one or more server computers including at least one database server configured to manage a database; and
a first server computer in the set of one or more server computers, the first server computer in communication with the database server and configured to:
provide access to one or more setup pages enabling users accessing the one or more setup pages to configure displays of information within trees by defining types of content stored in the database that is to be displayed in visual representations of the trees and where the types of content can be found in the database; and
store information received via the one or more setup pages in the database as tree specifications for the trees;
a second server computer in the set of one or more server computers, the second server computer in communication with the database server and configured to:
access a tree specification from the database, the tree specification defining:
a type of content stored in the database to be displayed in a visual representation of a tree, and
where the type of content can be found in the database;
generate a smart tree based on the tree specification and store the smart tree on the second server computer, the smart tree being a virtual tree resident on the second server computer that tracks configuration of the tree defined by the tree specification and specifies names associated with nodes of the visual representation of the tree, a hierarchy of the nodes and leaves of the tree, and information used to find the specified type of content in the database;
receive data of the specified type from the database based on the smart tree;
access a display information tree resident on the second server computer in response to receiving the data of the specified type, the display information tree being a virtual tree resident on the second computer server that tracks contents of the tree defined by the tree specification and provides:
information specifying how the type of content defined in the tree specification is arranged in the visual representation of the tree,
information specifying how one or more interactions that manipulate the type of content defined in the tree specification are arranged in the visual representation of the tree, and
information specifying how the second server computer creates coding for a tree image that generates the visual representation of the tree using the information specifying how the type of content defined in the tree specification is arranged in the visual representation of the tree and the information specifying how the one or more interactions that manipulate the type of content defined in the tree specification are arranged in the visual representation of the tree;
update, based on accessing the display information tree in response to receiving the data of the specified type, the display information tree resident on the second server computer to modify with the data of the specified type the information specifying how the type of content defined in the tree specification is arranged in the visual representation of the tree and the information specifying how the one or more interactions that manipulate the type of content defined in the tree specification are arranged in the visual representation of the tree;
access a display language tree resident on the second server computer in response to updating the display information tree, the display language tree being a virtual tree resident on the second computer server that contains coding for a tree image that generates the visual representation of the tree defined by the tree specification;
update, based on accessing the display language tree in response to updating the display information tree, the display language tree resident on the second computer server to modify the coding for a tree image that generates the visual representation of the tree defined by the tree specification according to the modified display information tree and the information specifying how the server computer creates coding for a tree image that generates the visual representation of the tree, the tree image supporting at least being pasted into a window of an application and being run from the window; and
update a tree image at an appliance in response to updating the display language tree resident on the second server computer.

2. The system of claim 1, wherein the second server computer is further configured to generate the coding for a tree image represented by Hypertext Markup Language (HTML) based on the display information tree.

3. The system of claim 1, wherein the second server computer is further configured to update the tree image at the appliance without updating the display information tree and upon each request for new information from the appliance.

4. The system of claim 1, further comprising the appliance, wherein the visual representation of the tree appears in a browser running on the appliance.

5. The system of claim 4, wherein the second server computer is further configured to receive update information entered into the browser using the one or more interactions.

6. The system of claim 5, wherein the second server computer is further configured to update the database based on the update information received from the browser.

7. The system of claim 1, wherein the first server computer is further configured to construct the tree specification based on data about an entity stored in the database, the constructing being performed prior to the tree specification being resident on the second server computer.

8. The system of claim 1, wherein the second server computer is further configured to construct the display information tree based on the tree specification and data about an entity stored in the database.

9. The system of claim 1, wherein the second server computer is further configured to:
initially access the database by at least
retrieving the tree specification, and
retrieving data about an entity indicative of the type of content stored in the database to be displayed in the visual representation of the tree; and
construct the smart tree and the display information tree based on the tree specification.

10. A system for generating representations of information, the system comprising:
a database; and a server computer that is configured to at least provide a visual representation of a tree that supports at least being pasted into a window of another application, and being run from the window;
wherein display of the visual representation of the tree when run from the window is updated in response to the server computer:
updating first information resident on the server computer to modify the coding for a tree image in response to updating second information resident on the server computer, the first information being a virtual tree resident on the server computer that contains coding for a tree image that generates the visual representation of the tree that supports at least being pasted into a window of another application and being run from the window;
updating the second information resident on the server computer in response to receiving data of a specified type from the database based on third information, the second information being a virtual tree resident on the server computer that tracks the contents of the tree and that defines:
information specifying how a type of content defined in a tree specification is arranged in the visual representation of the tree,
information specifying how one or more interactions that manipulate the type content defined in the tree specification are arranged in the visual representation of the tree, and
information specifying how coding for a tree image that generates the visual representation of the tree is created,
accessing the database using the third information resident on the server computer, the third information being a virtual tree resident on the server computer that is generated based on the tree specification and that tracks configuration of the tree defined by the tree specification and specifies names associated with nodes of the visual representation of the tree, a hierarchy of the nodes and leaves of the tree, and information used to find the specified type of content in the database.

11. A system for generating representations of information, the system comprising:
a database; and
a server computer that is configured to:
provide a visual representation of a tree to a browser associated with an agent, the tree indicative of information related to an online transaction,
receive the information as the online transaction occurs, and
alter the visual representation of the tree based on the information received as the online transaction occurs;
wherein the server computer is configured to alter the visual representation of the tree based on the information received as the online transaction occurs in response to the server computer:
updating a display language tree resident on the server computer according to a modified display information tree resident on the server computer to modify coding for a tree image that generates the visual representation of the tree, the display language tree being a virtual tree resident on the server computer that contains coding for a tree image that generates the visual representation of the tree, the tree defined by a tree specification and supporting at least being pasted into a window of another application and being run from the window;
updating a display information tree resident on the server computer in response to receiving data of a specified type from the database using a smart tree resident on the server computer, the display information tree being a virtual tree resident on the server computer that tracks the contents of the tree defined by the tree specification, the display information tree defining:
information specifying how the type of content defined in a tree specification is arranged in the visual representation of the tree, and
information specifying how one or more interactions that manipulate the type of content defined in the tree specification are arranged in the visual representation of the tree, and
information specifying how coding for a tree image that generates the visual representation of the tree is created using the information specifying how the type of content defined in the tree specification is arranged in the visual representation of the tree and the information specifying how the one or more interactions that manipulate the type of content defined in the tree specification are arranged in the visual representation of the tree,
accessing the database using the smart tree resident on the server computer, the smart tree being a virtual tree resident on the server computer that is generated based on the tree specification and that tracks configuration of the tree defined by the tree specification and specifies names associated with nodes of the visual representation of the tree, a hierarchy of the nodes and leaves of the tree, and information used to find the specified type of content in the database.

12. A system for generating representations of information, the system comprising:
a computer readable storage medium having instructions encoded thereon; and
a processor that supports at least
reading the instructions, and
running a program to perform operations for generating a tree based on the instructions; and
wherein the operations comprise at least
receiving data of a specified type from a database using a smart tree generated based on a tree specification in response to accessing the tree specification from a database, the smart tree being a virtual tree stored in the computer-readable storage medium that tracks configuration of the tree defined by the tree specification and specifies names associated with nodes of the visual representation of the tree, a hierarchy of the nodes and leaves of the tree, and information used to find the specified type of content in the database, the tree specification defining:
a type of content stored in the database to be to be displayed in a visual representation of a tree, and
where the type of content can be found in the database;
updating, based on accessing a display information tree in response to receiving the data of the specified type from the database using the smart tree, the display information tree stored in the computer-readable storage medium to modify with the data of the specified type information specifying how the type of content defined in the tree specification is arranged in the visual representation of the tree, information specifying how one or more interactions that manipulate the type of content defined in the tree specification are arranged in the visual representation of the tree in the display information tree, and information specifying how coding for a tree image that generates the visual representation of the tree is created using the information specifying how the type of content defined in the tree specification is arranged in the visual representation of the tree and the information specifying how the one or more interactions that manipulate the type of content defined in the tree specification are arranged in the visual representation of the tree, the display information tree being a virtual tree that tracks the contents of the tree and provides:

the information specifying how the type of content defined in the tree specification is arranged in the visual representation of the tree, and the information specifying how the one or more interactions that manipulate the type of content defined in the tree specification are arranged in the visual representation of the tree, and the information specifying how coding for a tree image that generates the visual representation of the tree is created using the information specifying how the type of content defined in the tree specification is arranged in the visual representation of the tree and the information specifying how the one or more interactions that manipulate the type of content defined in the tree specification are arranged in the visual representation of the tree; and update, based on accessing a display language tree in response to updating the display information tree, the display language tree stored in the computer-readable storage medium to modify coding for a tree image that generates the visual representation of the tree defined by the tree specification according to the modified display information tree, the display language tree being a virtual tree that contains the coding for a tree image that generates the visual representation of the tree defined by the tree specification, the tree image supporting at least being pasted into a window of another application and being run from the window;

the tree including at least nodes having parent/child relationships that appear when displayed in a tree;

the tree supporting at least storing relational information that is independent from the parent/child relationships.

13. The system of claim 12, wherein the relational information includes at least an aggregation relationship in which one or more dependent nodes are related to an independent node.

14. The system of claim 13, wherein deletion of the independent node initiates a deletion process for deleting the dependent nodes.

15. The system of claim 12, wherein the relational information includes at least an association relationship having two or more associatively related nodes.

16. The system of claim 15, wherein the tree supports initiating an updating process in response to a deletion of one of the associatively related nodes, the updating process updating others of the associatively related nodes.

17. A system comprising:
(I) a server including at least
  (a) an input/output system,
  (b) a memory system having at least
    (1) a long term memory system within which a method is encoded, and
    (2) a short term memory system,
  (c) a processor system for reading the method from the long term memory system and carrying out the method, and
  (d) a server communication system for transmitting communications within and between the processor system, the memory system, and the input/output system;
(II) a database communicatively connected to the server, the database being for storing at least
  (a) information about an entity, and
  (b) a tree specification defining a type of content stored in the database to be displayed in a visual representation of a tree and where the type of content can be found in the database;
(III) a network communicatively connected to the input/out system; and
(IV) an appliance communicatively connected to the network, the appliance including at least
  (a) a processor for at least
    (1) processing input from an agent,
    (2) communicating via the network with the server,
    (3) producing a tree image,
  (b) a browser for displaying the tree image, and
  (c) a display on which the browser is displayed;
(V) the method supporting at least
  (a) accessing the database by at least
    (1) retrieving the tree specification from the database, and
    (2) retrieving the information about the entity from the database,
  (b) constructing a virtual tree specification based on the tree specification and the information about the entity, the virtual tree specification tracking configuration of the tree defined by the tree specification and specifying names associated with nodes of the visual representation of the tree, a hierarchy of the nodes and leaves of the tree, and information used to find the specified type of content in the database,
  (c) storing the virtual tree specification in the short term memory system,
  (d) constructing a display information tree based on the tree specification and the information about the entity, the display information tree defining:
    how the type of content defined in the tree specification is arranged in the displayable tree image, and
    how one or more interactions that manipulate the type of content defined in the tree specification are arranged in the displayable tree image, and
    how to generate coding for the displayable tree image to include the content and the one or more interactions for manipulating the content,
  (e) storing the display information tree in the memory subsystem,
  (f) constructing a Hypertext Markup Language (HTML) tree based on the display information tree,
  (g) constructing the tree image based on the HTML tree, the tree image supporting at least being pasted into a window of another application and being run from the window,
  (h) receiving update information via the browser,
  (i) updating the database using the virtual tree specification in response to receiving the update information,
  (j) updating the display information tree using the virtual tree specification, based on the updating of the database, (k) updating the HTML tree using the updating of the display information tree to modify the coding for the HTML tree, (l) updating the tree image based on the updating of the HTML tree, (m) storing aggregative information about nodes independently from parent/child relationships that appear when the that is displayed, (n) deleting a first node, dependent on a second node as a result of having an aggregation relationship, the deleting of the first node being in response to deleting the second node and being performed regardless of the parent/child relationships, (o) storing an association relationship between nodes independently from the parent/child relationships, (p) updating a third node, related to a fourth node by the association relationship, the updating being in response to deleting the fourth node and being performed regardless of the parent/child relationships, (q) displaying the tree image pasted within a window of another application, and (r) entering other update information from within the window.

18. A system comprising:

a server computer;

a database;

a means for accessing the database to retrieve a tree specification, the tree specification defining a type of content stored in the database to be displayed in a visual representation of a tree and where the type of content can be found in the database;

a means for generating a smart tree based on the tree specification and storing the smart tree on the server computer, the smart tree being a virtual tree and tracking configuration of the tree defined by the tree specification and specifying names associated with nodes of the visual representation of the tree, a hierarchy of the nodes and leaves of the tree, and information used to find the specified type of content in the database;

a means for accessing the database using the smart tree to retrieve data of the specified type;

a means for updating a display information tree resident on the server computer, the display information tree defining how the type of content defined in the tree specification and associated with a displayable tree image is arranged in the displayable tree image, how one or more interactions that users can make with the displayable tree image for manipulating the type of content when viewable within the displayable tree image are arranged in the displayable tree image, and how coding for the displayable tree image is created according to how the type of content defined in the tree specification and associated with the displayable tree image is arranged in the displayable tree image and how the one or more interactions that users can make with the displayable tree image for manipulating the type of content when viewable within the displayable tree image are arranged in the displayable tree image;

a means for updating a display language tree resident on the server to modify the coding for displayable tree image based on output from the means for updating the display information tree, the display language tree being a virtual tree resident on the server computer that contains an Extensible Markup Language (XML) tree that generates the displayable tree image to include the content and the one or more interactions for manipulating the content stored in the database; and a means for updating a tree image displayed on an appliance based on output from the means for updating of the display language tree, the tree image supporting at least being pasted into a window of an application and being run from the window.

19. A method comprising:

accessing a database using a first specification resident on a server computer, the first specification being a virtual tree resident on the server computer that tracks configuration of a tree defined by a tree specification and specifies names associated with nodes of a displayable tree image of the tree, a hierarchy of the nodes and leaves of the tree, and information used to find a specified type of content defined by the tree specification in the database;

updating a second specification resident on the server computer based on the accessing, the second specification being a virtual tree resident on the computer server that tracks contents of the tree defined by the tree specification and provides:

information specifying how the type of content defined in the tree specification is arranged in the displayable tree image, information specifying how one or more interactions that manipulate the type of content defined in the tree specification are arranged in the displayable tree image, and information specifying how the server computer creates coding for displayable tree image using the information specifying how the type of content defined in the tree specification is arranged in the displayable tree image and the information specifying how the one or more interactions that manipulate the type of content defined in the tree specification are arranged in the displayable tree image;

updating an Extensible Markup Language (XML) tree resident on the server computer based on the updating of the second specification to modify the coding for the XML tree image, wherein the second specification enables the server computer to create an XML tree that generates the displayable tree image to include the type of content defined in the tree specification and the one or more interactions for manipulating the content stored in the database; and updating a tree image displayed on an appliance based on the updating of the XML tree, the tree image supporting at least being pasted into a window of an application and being run from the window.

20. The method of claim 19, further comprising conducting a transaction based on the tree image.

21. The method of claim 20, further comprising entering update information into a browser associated with the application based on the transaction.

22. A method comprising:

accessing a database using a computer system by at least retrieving a tree specification from the database, and retrieving data about an entity from the database;

constructing a virtual tree specification using the computer system based on the tree specification and the data, the virtual tree specification indicative of one or more interactions for manipulating the data stored in the database when viewable within a displayable tree image;

storing the virtual tree specification in short term memory of a server;

constructing a display information tree based on the data and the tree specification, the display language tree defining how to generate a displayable tree image to include the content and the one or more interactions for manipulating the data;
storing the display information tree within the server;
constructing a Hypertext Markup Language (HTML) tree based on the data and the display information tree;
storing the HTML tree within the server;
constructing a tree image within a browser on a display of an appliance based on the HTML tree, the tree image supporting at least being pasted into a window of an application and being run from the window;
receiving update information via the browser;
updating the database using the virtual tree specification, based on the update information;
updating the display information tree using the virtual tree specification, based on the updating of the database;
updating the HTML tree to modify the coding for the HTML tree based on the updating of the display information tree;
updating the tree image based on the updating of the HTML tree;
storing information about an aggregation relationship of nodes independently from parent/child relationships in tree display;
deleting a first node, dependent on a second node as a result of having the aggregation relationship, the deleting of the first node being in response to deleting the second node, the deleting of the first node being performed regardless of the parent/child relationships displayed in the tree image;
storing information about an association relationship between nodes independently from the parent/child relationships;
updating a third node, related to a fourth node by an association relationship, the updating being in response to deleting the fourth node, the updating being performed regardless of the parent/child relationships;
displaying the tree image from within a window of another application within which the tree image was pasted; and
entering other update information from within the window.

* * * * *

UNITED STATES PATENT AND TRADEMARK OFFICE
CERTIFICATE OF CORRECTION

| | | |
|---|---|---|
| PATENT NO. | : 7,694,219 B2 | Page 1 of 1 |
| APPLICATION NO. | : 10/327311 | |
| DATED | : April 6, 2010 | |
| INVENTOR(S) | : Songwen Xu | |

It is certified that error appears in the above-identified patent and that said Letters Patent is hereby corrected as shown below:

In column 2, line 3, delete "(XL," and insert -- (XML, --, therefor.

In column 4, line 37, after "of" insert -- . --.

In column 10, line 29, delete "604 is" and insert -- 604s --, therefor.

Signed and Sealed this
First Day of March, 2011

David J. Kappos
*Director of the United States Patent and Trademark Office*